Dec. 29, 1942.  R. C. DU PONT ET AL  2,306,690
APPARATUS FOR DELIVERING ARTICLES TO AND DISCHARGING
ARTICLES FROM AIRCRAFT WHILE IN FLIGHT
Filed May 18, 1939  3 Sheets-Sheet 1
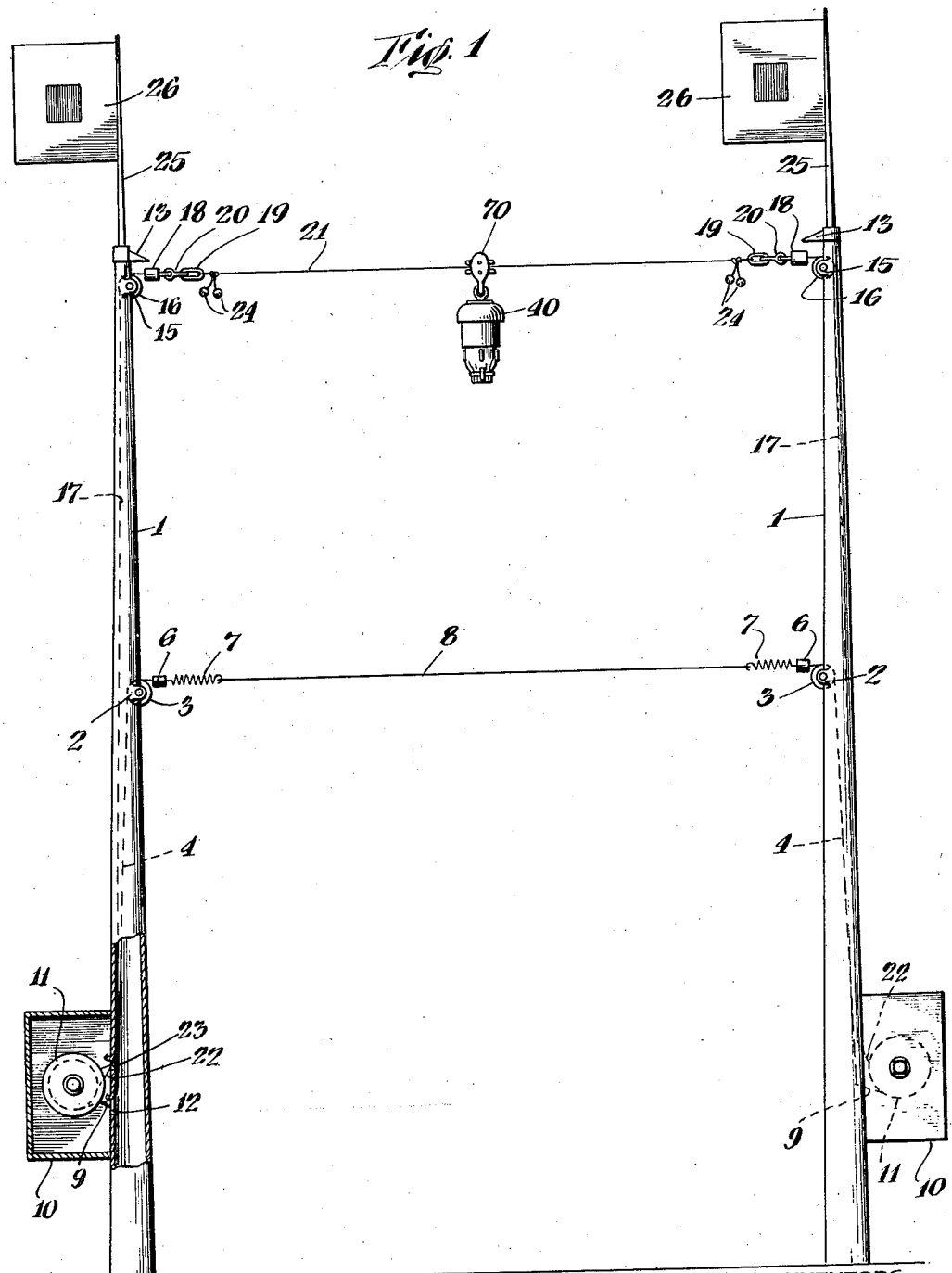
INVENTORS
Richard C. du Pont
BY James G. Ray
Albert M. Austin
ATTORNEY

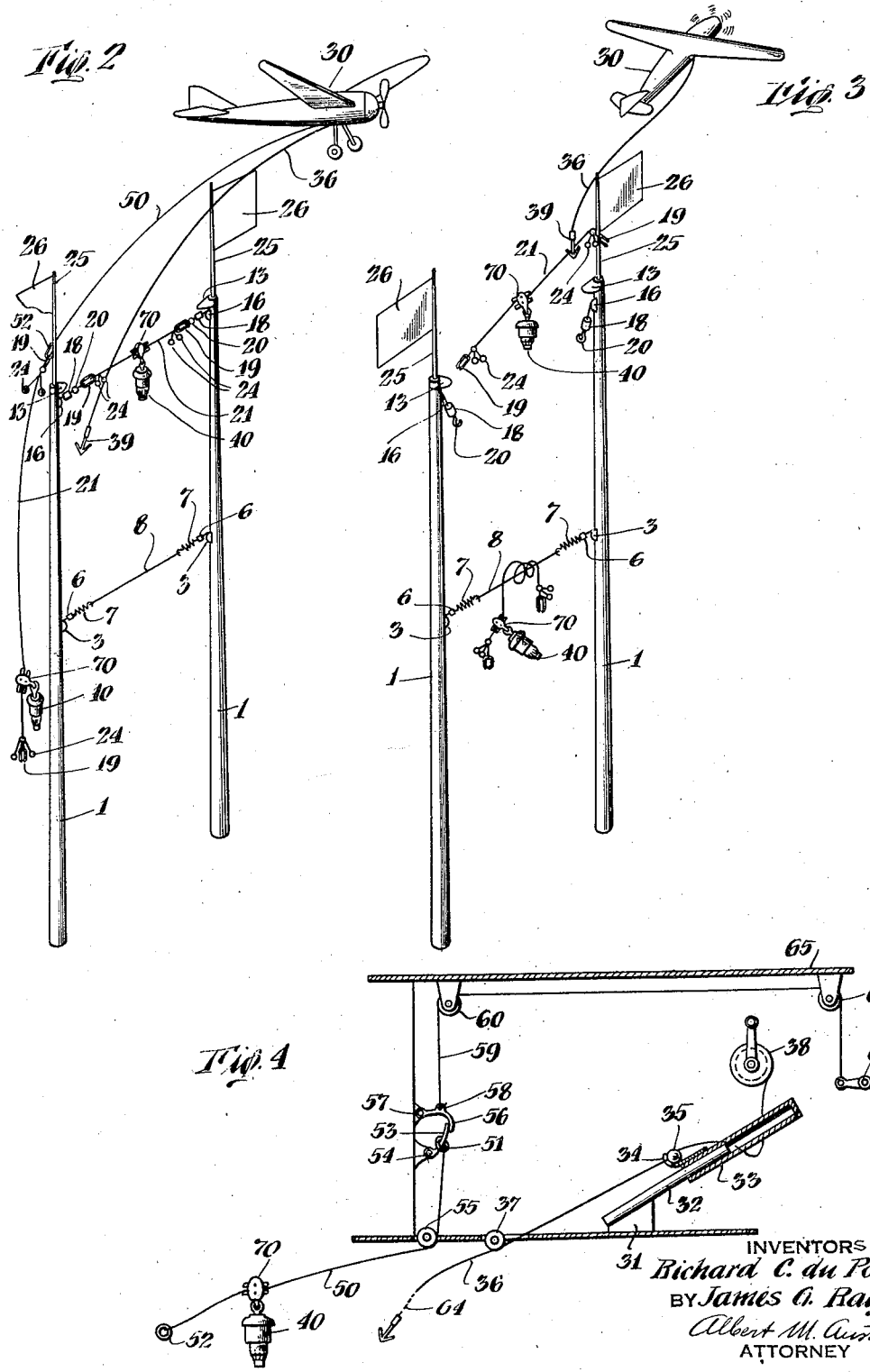

Dec. 29, 1942.    R. C. DU PONT ET AL    2,306,690
APPARATUS FOR DELIVERING ARTICLES TO AND DISCHARGING
ARTICLES FROM AIRCRAFT WHILE IN FLIGHT
Filed May 18, 1939    3 Sheets-Sheet 3
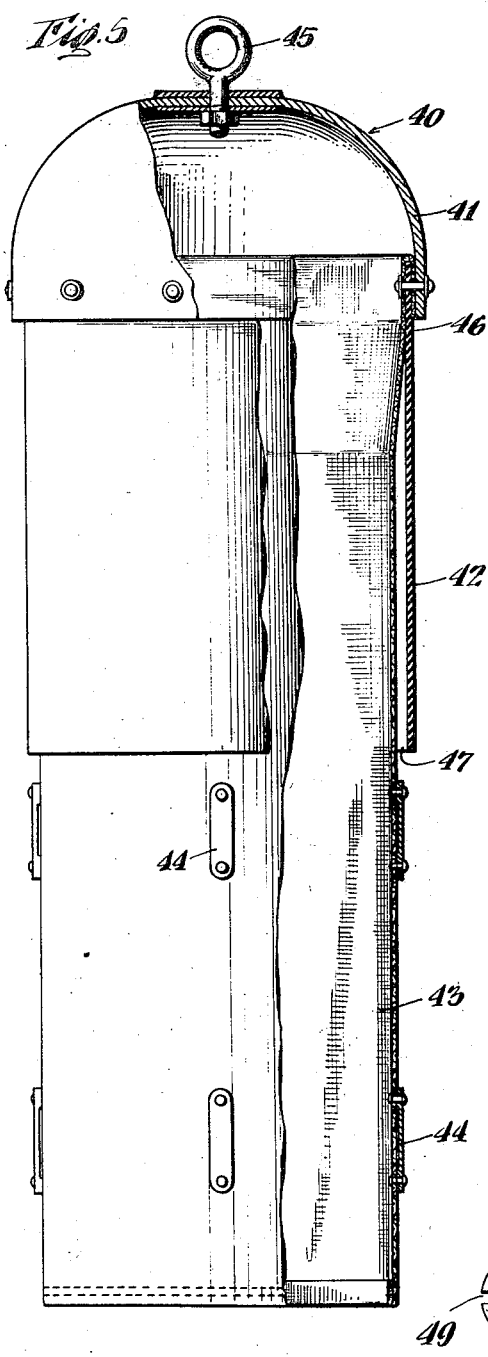
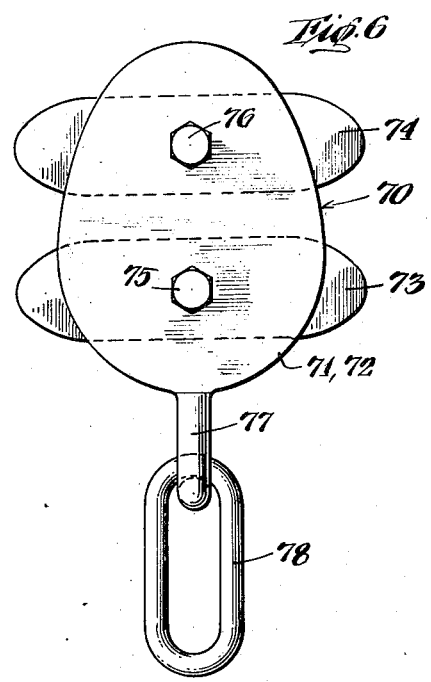
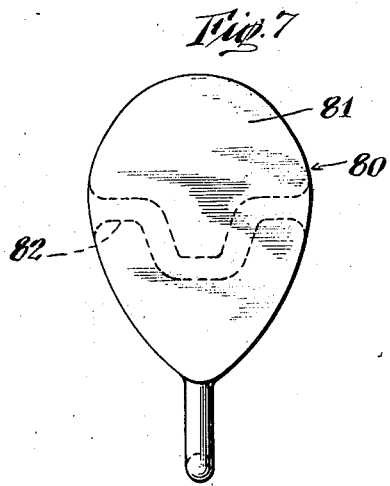
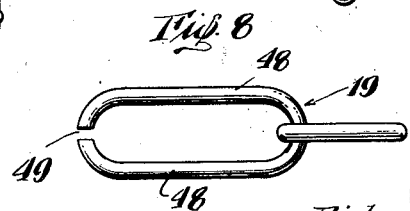
INVENTORS
Richard C. du Pont
BY James G. Ray
Albert M. Austin
ATTORNEY Patented Dec. 29, 1942

2,306,690

UNITED STATES PATENT OFFICE 2,306,690

APPARATUS FOR DELIVERING ARTICLES TO AND DISCHARGING ARTICLES FROM AIRCRAFT WHILE IN FLIGHT

Richard C. du Pont, Wilmington, Del., and James G. Ray, Hatboro, Pa., assignors to All American Aviation, Inc., Wilmington, Del., a corporation of Delaware Application May 18, 1939, Serial No. 274,329

4 Claims. (Cl. 258—1)

In the operation of aircraft, it is often desirable to either pick up from or deliver to places along the route of said aircraft, articles, such as mail, express, or pieces of freight. Frequently, the localities from which the articles are to be picked up or to which the articles are to be discharged, are so situated that it is not practical to make a landing at the localities, or the amounts to be picked up or discharged are so small as not to warrant the expense of interrupting the flight of the craft for a sufficient period to land and pick up, or discharge the article. Also, the time that is necessary to land, stop the craft, and take off again may be so great as to render such a service impractical.

This invention overcomes these obstacles by providing a means by which articles may be discharged from an aircraft while in flight or picked up by the aircraft while in flight or both operations may be performed substantially simultaneously.

In making such a pick-up or discharging articles from an aircraft, it is desirable to interrupt the flight of the plane as little as possible. In view of the tremendous speed at which aircraft now operate and in view of the possible addition to that speed by virtue of the direction of the air current, it is obvious that the problem of overcoming the shock incident to a pick-up or delivery is very important. The instant invention, while presenting a simple and effective means for picking up and delivering articles also presents an effective medium for absorbing the energy incident to either the pick-up or delivery, or both.

In the operation of the aircraft, it is essential that the pilot or person in control of the flight of the aircraft should be able to give his undivided attention to the navigation of the craft. It is, therefore, important that all the means for effecting a pick-up and delivery, may be operated without distracting the attention of the pilot. The present invention has provided for this by making the pick-up and delivery substantially automatic as far as the pilot is concerned. It is merely necessary for him in making the delivery to so navigate the ship that it will come over a designated point at a desired altitude.

It is also necessary when navigating a ship close to the ground with objects trailing therefrom to provide a means by which those objects may be quickly released in the event that they should become entangled in any substantially secure object on the ground. The present invention contemplates this and provides an automatic release if an object is encountered which offers a resistance which might be detrimental to the aircraft.

It is well known that the air currents about a craft while in flight will affect seriously any object being brought close to the aircraft. For this reason, it is necessary to provide any object of substantial size which is intended to be brought in to the aircraft or to be discharged from the aircraft with a shape such that it will be affected to a minimum by the air currents about the aircraft and at the same time will be governed, to a maximum degree, by the means by which it is connected to the aircraft. In the present invention, a container for articles to be picked up or discharged from the aircraft has been provided which is so shaped that it meets the heretofore mentioned requirement.

Various other features and advantages of the invention will be apparent from the following particular description and from an inspection of the accompanying drawings.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a view in elevation of a ground station adaptable for use in connection with an aircraft used in making a pick-up and delivery.

Fig. 2 is a diagrammatic, perspective view showing the ground apparatus with relation to the aircraft just as a pick-up and delivery is about to be made.

Fig. 3 is a similar view showing the relation between the aircraft and ground equipment just after a pick-up and delivery has been made.

Fig. 4 is a diagrammatic view in cross-section of the apparatus within the aircraft for suspending the delivery and pick-up lines from the aircraft.

Fig. 5 is a longitudinal sectional view of a desirable burden container for use in the system.

Fig. 6 is a view of a sliding connection for use in attaching the burden to the pick-up and delivery line.

Fig. 7 is a view of a modified form of sliding connection.

Fig. 8 is a detailed view of a desirable mechanism for connecting the pick-up and delivery line to the ground station and to the trailing line from the aircraft.

The ground apparatus as shown particularly in Figs. 1, 2, and 3 comprises generally a plurality of masts or uprights 1 which are preferably hollow. These masts, or uprights, are mounted in the ground in a substantially upright position.

At a suitable point intermediate the upper and lower ends of the upright, may be located a cutaway section in the upright 1 which provides a support 2 for a pulley 3. The pulleys 3 are preferably located with their axles substantially flush with the outer edge of the upright so that one-half of the pulleys will be on the outside of the upright and half on the inside. Hoist lines 4 are adapted to pass over the pulleys 3 with the upper end of the hoist lines 4 passing through the upright 1 and out over the pulleys 3 with a weight 6 attached thereto. To these weights or to the end of the lines 4 may be attached shock absorbers 7 by any suitable means. Suspended between the shock absorbers 7 and secured thereto by suitable means is a burden-retaining or catch line 8.

The lower end 9 of the hoisting line 4 may pass through a hole 12 in the upright 1 and then into boxes 10 located on the outside of the upright 1. A winch 11 may be provided in each of the boxes 10 on which the ropes 4 are adapted to be wound up in order to hoist or lower the burden-retaining line 8.

In the event that it is desired to detach the burden-retaining line 8 and the shock absorber 7 from the hoisting line 4, the weights 6 have been provided so that with the burden-retaining line detached, the hoisting line 4 may be raised and the weights brought up flush against the outside of the upright 1. When it is again desired to attach the retaining line 8, the hoisting lines 4—4 may be payed out from the winch 11. The weights 6 will cause the ends of the hoisting lines 4—4 to descend so that the retaining line 8 may be reattached.

Adjacent the upper end of the upright 1 are cutaway sections forming a housing or support 15 for upper pulleys 16 over which hoisting ropes 17 are adapted to pass. Attached to these ropes adjacent their upper end and exteriorly of the upright 1 may be weights 18 for the same purpose as the weights 6 on the lower hoisting lines 4. A snap-hook 20 may be provided in the end of the weights 18 or suitably connected thereto. This snap-hook is adapted to fasten into a releasing link or breaking link 19 which may be attached to a burden line 21. The lower end 22 of the ropes 17 may pass through holes 23 into the boxes 10 where they are adapted to be wound up on the winches 11. In addition to the breaking link 19 the pick-up and delivery line 21 may have weights 24 in the shape of monkeys' fists attached thereto adjacent its end.

Each upright 1 may be provided with a cap 13 which protects the upper pulley 16 and the openings and support 15 against the entrance of snow and ice and facilitates the operation of the ropes during bad weather. Each upright may also be provided with a marker pole 25, having a suitable indicating or marking flag 26 attached thereto.

The aircraft for effecting the pick-up and delivery is designated generally as 30. There may be mounted within the fuselage 65 of the aircraft 30 a piston and cylinder supporting frame 31 carrying a cylinder 33 adapted to slide over a piston 32. Mounted on the cylinder 33 and preferably adjacent its lower end is a socket 34 into which a ball 35 attached to a pick-up line 36 is adapted to be fitted.

Mounted within the fuselage 65 there may be a pulley or groove 37 which is adapted to receive the pick-up line 36 and guide it as it leaves the aircraft.

A winch 38 onto which the pick-up line 36 may be attached may be provided adjacent the cylinder 33. Adjacent the other end of the burden-transferring line 36 and intermediate a grapple 39 may be provided a breaking link or weak section 64. The grapple 39 may be of any conventional type.

In addition to the pick-up line 36 there may be trailed from the aircraft 30 a delivery line 50 which preferably has a ring 51 in the upper end of it and a ring 52 in the lower end also. This line passes over a groove or pulley 55 located in the fuselage 65. The ring 51 is adapted to fit over a pivotal member 53 which is pivotally attached to the fuselage of the aircraft as at 54.

Cooperative with the pivotal member 53 and adapted to lock against it to prevent it swinging down and thus releasing the ring 51 except when desired, may be located a second pivotal member 56 pivoted to the fuselage 65 as at 57. Attached to this second pivotal member 56 at any desirable point, such as 58 may be a control rope 59 which preferably passes over a guiding pulley or other roll 60 attached to the fuselage of the plane and thence to another guiding member 61 and down to a tripping release 62 pivoted as at 63 to the fuselage of the aircraft.

The burden container best suited for use in a system such as that contemplated in the present invention is shown in Fig. 5 generally as 40 and comprises a nose section 41, a first semi-rigid skirt portion 42 connected thereto and a second canvas skirt portion 43 connected as shown to the first skirt portion 42. In addition, there may be means 44 provided thereabout through which a strap of any conventional type may be inserted to close the canvas skirt portion. A nose ring or snap-hook 45 may be provided in the nose section 41 of the burden container 40 whereby it may be connected to whatsoever means by which it is to be carried.

As is clearly shown in Fig. 5, the burden container presents an enlarged nose section 41 with a body 42 and 43 each succeeding section being smaller in its outside diameter than the outside diameter of the next preceding section. In addition to this shape, the contour of the container is broken as at 46 and 47. Thus, air passing over it will be spoiled and caused to flow turbulently or "burble". As a result, when a pull is applied to the large end by a line from an aircraft, the container will tend to trail smoothly with a minimum of gyrating. In addition to these features, the skirt 43 is collapsible and can be folded up at the desired point. As a consequence the burden may be carried in the container so that the center of gravity will be at a desired point. This will aid in making the container trail smoothly.

The burden container shown in Fig. 5 is described and claimed in du Pont application Serial No. 304,890 filed November 17, 1939, now Patent No. 2,298,688, dated Oct. 13 1942.

In Fig. 6 is shown a particular type of sliding connection 70, particularly adapted for connecting the container to the burden line. The connection 70 comprises broadly two cheek pieces 71 and 72 with two substantially parallel oval-shaped members 73 and 74 pivotally depended therebetween as by the pivotal connections as 75 and 76. The members 73 and 74 are spaced apart and define with the cheek pieces 71 and 72 a passage to admit a line. A strap member 77 with a ring 78 therethrough may be provided to be connected to the nose ring or snap-hook 45 in the container 40.

The sliding connection or slider 70 and its co-operation with the rest of the system is described and claimed in Yesulaites application Serial No. 313,235, filed January 10, 1940.

In Fig. 7 is shown a modified form of the sliding connection, designated generally as 80, which comprises a block member 81 with a curved passage 82 therethrough.

In Fig. 8 is shown a desirable breaking link 19 which comprises generally a spring link member 48 with a gap 49 therein. Thus, when a second link is inserted therethrough, it may be withdrawn if the force exerted on it is greater than the tensile strength of the link 19.

The operation of the system and apparatus, assuming that it is desired to pick up from the ground an object or other matter which can be put into a container, is as follows:

The hoist lines 17 are lowered to a point adjacent the ground and the burden line 21 with the container 40 connected thereto as by the sliding block 70 is attached to the snap-hook 20 in the end of the weights 18 on the ends of the hoisting line. The lower ends of the hoisting lines are then attached to the winches 11 and the hoisting lines wound up thereon until the burden line 21 has approached to a point adjacent the upper ends of the uprights 1.

The aircraft 30 is then put into the air and when it has reached a sufficient altitude, the pick-up line 36 with the grapple 39 attached thereto with the weak link or breaking link 64 therebetween is lowered from the aircraft a desired distance. This distance is preferably adjusted so that the grapple 39 hangs a desirable distance below the aircraft.

The aircraft is then flown in such a manner that the grapple 39 will pass below the burden line 21 suspended on the uprights 1. As the pick-up line 36 strikes the burden line 21, it will put a sufficient force thereon to break the breaking links 19 away from the connecting link 20. Thus, the burden line with the burden container attached thereto will be broken loose from the uprights.

If, as is shown in Figs. 2 and 3, the pick-up line 36 trailing from the aircraft strikes the burden line 21 between the point where the burden container 40 is attached to the burden line 21 and the right hand upright, the burden line 21 will slide relative to the pick-up line 36 until the burden line 21 comes into the bills of the grapple 39.

At this point, it is obvious that the burden line 21 must assume the speed of the aircraft. The acceleration of the burden line at this point will be very rapid and would throw a tremendous strain upon the burden and burden container 40 unless there were some energy absorbing means interposed. As is shown clearly in Fig. 6, the sliding connecting member 70 with its two substantially parallel pivotal members 73 and 74 with the ropes 21 passing therebetween will have a tendency to turn so as to bring the two parallel members 73 and 74 to press strongly upon the line 21. It can be seen from Fig. 3 that the maximum turning effort exerted will occur as the pick-up and delivery line 21 is grabbed by the grapple 39. Thus, the resistance to slipping will be at a maximum when the resistance to movement is at a maximum and the burden line 21 will slowly slide through the parallel members. As a result, the burden container will be slowly accelerated and as it accelerates the turning moment on the block 70 will diminish with the result that the grip on the line 21 will diminish.

By properly proportioning the distance between the members 73 and 74 with relation to the size of the pick-up and delivery rope 21, the amount of friction between the burden line 21 and the members 73 and 74 will be so adjusted due to the change in resistance of the burden and the tensile force exerted by the grapple and delivery line 39 and 36 respectively that the friction between them will balance out at a certain point, usually before the sliding connection 70 has come to the end of the burden line 21. In the event that the friction is not sufficient to stop the sliding member 70 from going to the end of the burden line 21 the weighted members 24 are provided which present an enlargement over which the sliding member cannot pass.

The operation of the "fixed" slider or block 80 of Fig. 7 will be similar to that of the "pivoted" slider of block 70 just described in that the friction between the block and the line it grips limits the accelerating force applied to the burden 40; except that, in the case of fixed block 80, due to the fixed nature of its tortuous path 82, the friction between it and the line passing therethrough will remain more uniform.

In addition to the shock absorbing means thus provided, the piston and plunger in the aircraft designated in Fig. 4 as 32 and 33 respectively, with the socket 34 into which the ball 35 on the pick-up line 36 fits will also serve as a shock absorber. The throw of this shock absorber is limited by the dimensions of the aircraft and therefore only a limited amount of energy may be absorbed here. This will, however, prevent the passage of any tremendous shock to the aircraft.

Once the burden line 21 has been grabbed by the grapple 39 the delivery line 36 may be wound into the aircraft by means of the winch and the burden and burden-container deposited in any desired place.

In discharging articles from the aircraft two systems generally may be employed. In one of these, illustrated in Fig. 2, the article to be discharged from the aircraft is trailed on a length of the burden line 21 attached to a line 50. The line 50 is payed out from the aircraft and when it has reached the end, the connection 51 is attached to the pivotal member 53.

The aircraft is then operated in such a manner as to bring the burden line with its burden 40 attached thereto between the uprights 1. The burden-retaining line 8 is suspended between the uprights 1 and connected to the hoist lines 4 as by the shock absorbers 7 which are attached to the weights 6 on the upper end of the hoist lines 4.

The aircraft is flown at such an altitude that the burden to be discharged will pass between the uprights and at an altitude such that it will be between the ground and the burden-retaining wire 8, yet the connection between the breaking link 19 and the ring 52 in the end of the discharge line 50 will pass above the burden retaining line 8. As the rearward burden line 21 strikes the burden retaining line 8, it is obvious that a tremendous force will be built up on the breaking link 19 which will cause it to release from the ring 52.

The weighted ends 24 of the burden line will of course tend to continue in their normal path but being resisted by the burden retaining line 8 their energy will be resolved into a circular motion with the result that the rearward burden line 21 with the burden 40 attached thereto will be suspended upon the burden retaining line 8.

In another system of delivery illustrated in Fig. 4, the delivery line 50 on which the burden to be delivered is suspended, is attached directly to the pivotal member 53 within the aircraft. The aircraft is then navigated in such a manner that it will come over a desired point at a desired altitude. It is obvious that the pilot at this time is occupied with controlling his craft due to the proximity to the ground and the possibility of obstructions being in the way. For this reason his attention must not be distracted by having to perform any additional operations.

It is possible, however, to put a control member on the side of the aircraft adjacent the pilot which may be struck by his knee with a very simple movement. For this reason, there is provided the pivotal member 62 pivoting on a point 63 with the connecting cord 59 attached thereto.

As the aircraft arrives over the desired point to make a discharge the pilot strikes the pivotal member 62. This member is so pivoted that any movement of the pivotal member will tend to lengthen the distance between the end of the pivotal member 62 and the point 58 on the pivotal member 55. With the result, since these two points are connected by the line 59, the point 58 will have to move up toward the point 60, and consequently will pull the pivotal member 55 away from the pivotal member 53, thus allowing the pivotal member 51 to swing down and allow the burden line 21 with its connection thereon to slide over the pivotal member 51 and be released from the aircraft.

It is obvious that there may be times when it will be desirable to perform either of the systems of delivering articles at the same time that one is making a pick-up of an article from the ground. It has been found that by making the grapple 39 of a sufficient weight and making the pick-up line 36 of a sufficient weight and thickness, this line will tend to swing down from the aircraft in a fairly straight line. On the other hand, the line 50 with the burden attached thereto will tend to trail out behind the aircraft and away from line 36. As a result, these two lines may be payed out from the aircraft at the same time and will not become entangled. Consequently, it is possible to so navigate the aircraft that the grapple 39 will pass between the suspending line 8 and the burden line 21 on the ground station and at the same time the burden line 21 attached to the discharge line 50 will strike the retaining line 8 and leave the article deposited thereon. If it is not desired to do it this way, the retaining line 8 may be omitted and the release 62 tripped at the desired point.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What is claimed is:

1. In an air pick-up system, a ground station comprising spaced poles, a burden line having enlargements at the ends thereof, frangible connections between the ends of said burden line and said poles, a burden, a friction block connected to said burden, said block being of one-piece construction and having a tortuous passage through which said burden line passes with a snug fit, an aircraft, a pick-up line depending from said craft having a grapple at the lower end thereof, said grapple being adapted to engage said burden line when said craft flies over the ground station to pick up the burden, said block having sufficient frictional engagement with said burden line to impart a limited accelerating force to said burden, the enlargements on either end of said burden line preventing said block from sliding off the line.

2. In an air pick-up system, a ground station comprising spaced supports, a burden line having enlargements at the ends thereof, frangible connections between the ends of said burden line and said supports, a burden, a friction slider connected to said burden, said slider having a passage through which said burden line passes with a snug fit, an aircraft, a pick-up line depending from said craft having pick-up devices at the lower end thereof, said pick-up devices being adapted to engage said burden line when said craft flies over the ground station to pick up the burden, said slider having sufficient frictional engagement with said burden line to impart a limited accelerating force to said burden, the enlargements on either end of said burden line preventing said slider from sliding off the line.

3. In an air pick-up and delivery system, a ground station comprising spaced poles set in the ground, an upper burden line having frangible connections with said poles, a lower receiving line, shock absorbers between the ends of said receiving line and said poles, an aircraft, a pick-up line depending from said craft having a grapple on its lower end, a delivery line depending from said craft and trailing behind said pick-up line, a second burden line having weights on the opposite ends thereof, a burden attached to the lower end of said second burden line, a second-mentioned frangible connection between said delivery line and said burden line whereby, when the aircraft flies over the ground station, the pick-up line engages the first burden line with the grapple above said delivery line and thereafter the second burden line engages said receiving line, causing the second-mentioned frangible connection to break and one of said weights to rotate around the receiving line.

4. In an aircraft pick-up system, an aircraft, a burden to be picked up by said aircraft while in flight, devices for establishing yieldable connection between said aircraft and said burden, said devices comprising a line and a slider for jointly pulling said burden, said slider having a passage snugly fitting said line to frictionally grip said line, the friction between said slider and said line applying a limited accelerating force to said burden without rebound.

RICHARD C. DU PONT.
JAMES G. RAY.